United States Patent [19]

Scholten et al.

[11] Patent Number: 4,933,379

[45] Date of Patent: Jun. 12, 1990

[54] PROCESS FOR PREPARING AQUEOUS PAINT COMPOSITION

[75] Inventors: Henricus P. H. Scholten; Tette J. Dijkstra; Roeland Van Iperen, all of Amsterdam, Netherlands

[73] Assignee: Shell Oil Company, Houston, Tex.

[21] Appl. No.: 245,958

[22] Filed: Sep. 15, 1988

Related U.S. Application Data

[63] Continuation of Ser. No. 29,928, Mar. 26, 1987, abandoned.

[30] Foreign Application Priority Data

Apr. 1, 1986 [GB] United Kingdom ............... 8607938

[51] Int. Cl.$^5$ ............................................. C08L 63/00
[52] U.S. Cl. .................................... 523/404; 523/414; 523/415; 523/416; 523/417; 523/442; 523/443
[58] Field of Search ............... 523/414, 415, 416, 417, 523/404

[56] References Cited

U.S. PATENT DOCUMENTS

| | | | |
|---|---|---|---|
| 4,048,179 | 9/1977 | Shen et al. | 523/416 |
| 4,100,315 | 7/1978 | Lauterbach | 427/379 |
| 4,225,479 | 4/1980 | Hicks | 523/416 |
| 4,251,415 | 2/1981 | Nakada et al. | 523/417 |
| 4,374,965 | 2/1983 | Dickie et al. | 523/416 |
| 4,446,257 | 5/1985 | Kooijmans | 523/403 |
| 4,524,161 | 6/1985 | Feuerhahn | 523/414 |
| 4,568,709 | 2/1986 | Paar et al. | 523/417 |
| 4,575,524 | 3/1986 | Anderson et al. | 523/415 |
| 4,609,691 | 9/1986 | Geist et al. | 523/416 |

FOREIGN PATENT DOCUMENTS 136743 4/1985 European Pat. Off. .

Primary Examiner—John C. Bleutge
Assistant Examiner—David W. Woodward

[57] ABSTRACT

A process is disclosed for preparing an aqueous paint composition including the steps of
(a) mixing a pigment powder having a particle size less than about 20 micrometers, a cross-linking agent and an epoxy resin to form a liquid, solvent-free paste;
(b) reacting the resultant paste with a secondary amine to provide at least one N-H function per epoxy group of the epoxy resin; and
(c) neutralizing the resulting suspension of particles coated with an epoxy-amine adduct and a cross-linking agent.

Also provided is a coating process employing the invention aqueous paint composition containing a transesterification-promoting metal compound.

14 Claims, No Drawings

PROCESS FOR PREPARING AQUEOUS PAINT COMPOSITION

This is a continuation, of application Ser. No. 029,928, filed Mar. 26, 1987, now abandoned.

BACKGROUND OF THE INVENTION

This invention relates to a process for preparing an aqueous paint composition and to a coating process employing the composition.

U.S. Pat. No. 4,100,315 discloses a method for preparing aqueous coating powder dispersions containing as the binder a solid epoxy resin which is micronized in water in the presence of a specific combination of surfactants. For many applications, however, the presence of surfactants in the cured coating is not desirable.

European Patent Application No. 84201186.8 discloses the preparation of a solvent-free aqueous binder composition by a process which includes the steps of (a) dispersing pigment powder having a particle size less than 20 micrometers in a liquid, solvent-free epoxy resin, (b) dispersing the resultant paste in water, (c) reacting the resultant dispersion with a secondary amine, and optionally also a primary amine, the amount of amine or amines being sufficient to provide at least one N—H function per epoxy group of the epoxy resin, at a temperature in the range 40° C. to 100° C.; (d) neutralizing the resulting suspension of epoxy-amine adduct coated particles, and, optionally, (e) adjusting the concentration of the resulting dispersion within the range of 35 to 75 %w solids by addition of water.

By "solvent-free" is meant "free from organic solvents."

The above European patent application also discloses a process for preparing an aqueous paint composition which includes the steps of adding to the aqueous binder composition prepared by the described process a cross-linking agent which for practical purposes is mixed with pigment powder to form a paste, and adjusting the concentration of the composition by addition of water to ensure a solids content in the range 10 to 65 %w.

However, the above described process suffers from the difficulty of obtaining a homogeneous dispersion in step (b), and the high viscosity of the suspension obtained in step (c). Furthermore, the aqueous paint composition has a relatively low solids content at application viscosity.

The object of the present invention is therefore to provide a simplified method for preparing a solvent-free, aqueous epoxy resin-based paint composition.

BRIEF DESCRIPTION OF THE INVENTION

According to the invention, a process is provided for preparing an aqueous paint composition which includes the steps of (a) mixing a pigment powder having a particle size less than 20 micrometers, a cross-linking agent and an epoxy resin to form a liquid, solvent-free paste; (b) reacting the resultant paste with a secondary amine, optionally with a mixture of a primary amine and a secondary amine, the amount of amine being sufficient to provide at least one N—H function per epoxy group of the epoxy resin, at a temperature in the range of from 20° C. to 140° C.; and (c) neutralizing the resulting suspension of particles coated with epoxy-amine adduct and cross-linking agent; and (d) adjusting the concentration of the resulting dispersion by addition of water to ensure a solids content in the range of from about 10 to 80%w solids.

The practice of the invention process enables the preparation of a homogeneous paste in step (a) and a low-viscosity suspension in step (b). Furthermore, the aqueous paint composition obtained in step (c) has a relatively high solids content at application viscosity.

It is possible to prepare separately a pigment/cross-linking agent paste and an epoxy resin pigment paste. This, however, is not necessary. Therefore, according to a preferred embodiment of the present invention, step (a) is carried out by dispersing the pigment powder in a solvent-free liquid mixture of the cross-linking agent and the epoxy resin. The use of the process eliminates the need for a surfactant in the coating composition.

DETAILED DESCRIPTION OF THE INVENTION

As used herein, the term "pigment powder" includes all water-insoluble solid paint additives such as conventional pigments, fillers and extenders. Examples of such materials include titanium oxide, barytes, clay, microtalc and black iron oxide. The particle size of the pigment powder is less than 20 micrometers, preferably less than 10 micrometers, and advantageously less than 5 micrometers.

The epoxy resin is preferably a polyglycidyl ether of a polyhydric phenol and may be liquid or solid at ambient temperature. Advantageously the epoxy resin is a polyglycidyl ether of a dihydric phenol. Conveniently the epoxy resin is a liquid polyglycidyl ether of 2,2-bis(4-hydroxyphenyl)propane. Provided that the eventual epoxy-amine adduct includes on average at least two hydroxy moieties per molecule, the epoxy resin may, if desired, be a monoglycidyl compound. Another example of an epoxy resin which may be used is an epoxy novolac resin. Further examples of epoxy resins are polyglycidyl ethers having on average n epoxy groups per molecule, where $1 < n \leq 2$, which ethers are the reaction product of a multifunctional polyglycidyl ether having on average x epoxy groups per molecule, where $x > 2$, with $(x-n)$ mol of a monofunctional phenol per mol of the multifunctional polyglycidyl ether, as described in European patent application No. 0 127 915.

Epoxy compounds can react with amines having at least one reactive N—H function according to the general addition reaction:

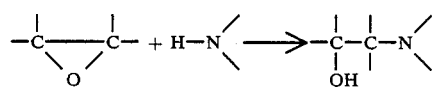

The secondary amine employed in step (b) may contain one or more substituents which do not react with epoxy groups under the reaction conditions, e.g. hydroxyl, ketimine and ester groups. Suitable secondary amines include dialkanolamines, N-alkylalkanol-amines, dialkylamines and adducts of alkanolamines with aliphatic monoepoxides.

Preferably the secondary amine comprises at least one compound selected from the group consisting of di($C_{2-6}$-alkanol)amines, N-$C_{1-6}$-alkyl-$C_{2-6}$-alkanolamines, di($C_{1-6}$-alkyl)amines and adducts of $C_{2-6}$-alkanolamines with $C_{9-25}$-aliphatic monepoxides, in each of which amines a hydrogen atom bound to a carbon atom may be substituted by a di($C_{1-6}$-alkyl- )amino group. Examples of such secondary amines are diethanolamine, diisopropanolamine, methyl-2-hydroxyethylamine, diethylamine and the adduct of monoethanolamine with a $C_{9-14}$, preferably $C_{12-14}$, aliphatic monoglycidyl ether. The secondary amine may, if desired, have a ketimine function. Mixtures of secondary amines may be employed. The secondary amine may advantageously be employed in admixture with a primary amine.

It is a feature of the present invention that the primary and secondary amine may be added simultaneously in step (b). The primary amine is preferably an alkylamine or particularly an alkanolamine in each of which amines a hydrogen atom bound to a carbon atom may be substituted by a di($C_{1-6}$-alkyl)amino group. Most preferred are $C_{2-6}$-alkanolamines, such as monethanolamine or monoisopropanolamine. Among the alkylamines $C_{1-6}$-alkylamines are preferred.

The reaction temperature in step (b) is preferably at least 30° C., and is preferably not greater than 100° C.

In step (c), the suspension is preferably neutralized to a degree of neutralization in the range 0.2 to 1.5, more preferably 0.3 to 1.0, by addition of a monobasic carboxylic acid, advantageously a $C_{2-6}$-carboxylic acid such as acetic acid.

The epoxy resin/amine adducts produced in step (b) above have a plurality of alcoholic hydroxyl functions per molecule, at least part of these formed by the addition reaction of epoxy with an N-H function. Additional hydroxyl functions will be present when the amine and/or the epoxy resin starting materials already contain hydroxyl groups.

Suitable cross-linking agents are compounds or compositions having a plurality of groups which are reactive with alcoholic functions during cure. Well-known cross-linking agents of this type are phenolic resins, in particular resoles; aminoplast resins such as those derived from urea, melamine or benzoguanamine; blocked polyisocyanates; and preferably non-acidic polyesters of polycarboxylic acids which esters have more than one, and preferably at least two, beta-hydroxyl ester groups per molecule. When such polyesters are used, a transesterification-promoting metal compound is also incorporated in the paint composition.

Phenolic resins of the resole type contain methylol groups which may be etherified and which can react with hydroxyl groups of the epoxy resin/amine adduct; in addition cross-linking reactions can occur between the resole molecules themselves.

Aminoplast resins as used generally in thermosetting resin systems may be derived from urea, melamine, or benzoguanamine, and an aldehyde, usually formaldehyde, and generally etherified with a lower alcohol such as methanol, ethanol or butanol.

Polyisocyanate derivatives to be used in aqueous thermosetting resin systems have to be blocked with a reactant that effectively blocks the isocyanate groups at temperatures used in the preparation of the system and are set free at curing temperatures, generally above 120° C. Examples of suitable blocking agents are monohydric alcohols, monohydric phenols and certain nitrogen compounds, such as caprolactam.

Non-acidic polyesters of polycarboxylic acids have an acid value not greater than 0.18 meq/g (acid number not more than 10), preferably not more than 0.09 meq/g. Beta-hydroxyl ester in this context means that the alcohol-derived moiety of the ester has a beta-hydroxyl group; in other words the ester function is a derivative of a 1,2-glycol of which only one of the hydroxyl functions has been esterified. The glycol part may have substitutes, such as alkyl, ether or stable ester groups. The beta-hydroxyl group is needed for sufficient cross-linking at acceptable temperatures within acceptable times, for example at temperatures up to 200° C. and curing times of up to 30 minutes. By the process of curing or stoving the coating, beta-hydroxyl ester groups of the polyester transesterify to the effect that ester bonds are formed between carboxyl groups of the polyester and hydroxyl groups of the epoxyamine adduct with release of a glycol-type compound; the latter may then evaporate. The result is a cross-linked coating which is solvent-resistant and infusible.

Suitable non-acidic polyesters having beta-hydroxylester groups can be prepared from a polycarboxylic acid or anhydride thereof, and one or more glycols, and/or mono-epoxides, for example from azelaic acid, terephthalic acid, isophthalic acid, phthalic anhydride, trimellitic anhydride, ethylene glycol, ethylene oxide, propylene oxide, glycidyl esters of $C_{10}$-monocarboxylic acids. Examples of polyesters are bis(2-hydroxyethyl)-terephthalate, lower (2-hydroxyethyl)-terminated polyalkylene glycol terephthalates, and the di-beta-hydroxy ester reaction product of azelic acid and the glycidyl ester of a saturated $C_{10}$-monocarblxylic acid or of azelaic acid and n-butyl glycidyl ether.

The weight ratio epoxy-amine adduct to cross-linking agent is not critical and may vary within wide limits, suitably in the range of from 0.25 to 4.

Suitable transesterification-promoting metal compounds include, for example, salts (e.g. octoates or naphthenates) of lead, zinc, calcium, barium and iron-(III). A suitable example of a metal complex is titanium acetylacetonate. Other suitable salts, although in general less active than those mentioned above, are salts of tin(II), manganese, cobalt and dibutyltin, for example dibutyltin dilaurate. Further metal salts that can be mentioned in general are octoates and naphthenates of the alkali and alkaline earth metals, of the lanthanides, and of zirconium, cadmium, chromium, and acetylacetonate complexes of lead, zinc, cadmium, cerium, thorium and copper. Zinc otoate and zinc acetate have been found to give very acceptable results. Mixtures of such salts and/or complexes may be used.

Metal content of the transesterification-promoting metal compounds should preferably be in the range 0.3 to 2 weight percent, preferably 0.5 to 1.8 weight percent, based on the combined weight of all organic material in the paint composition.

The invention also includes paint compositions prepared by the processes of the invention. In the paint compositions the pigment/ (crosslinking agent plus amine adduct) weight ratio preferably lies in the range 0 4 to 1.5. The paint composition may contain, apart from the pigment powder incorporated in step (a), additional components conventional in paints, such as pigments, fillers, thixotropic agents, stabilizers, plasticizers, flow control agents and disinfectants.

The water to be used in the processes of the invention is preferably purified, by distillation or demineralisation, and may contain suitable additives such as disinfecting agents.

The invention also includes a process for coating a surface which comprises applying to the surface a paint composition of the invention containing a transesterification-promoting metal compound, drying the composition and curing by action of heat.

The paint compositions may be applied to a substrate by means known in the art, such as by brush or roller, or by spraying or dipping onto a variety of materials, preferably on metals such as bare steel, phosphated steel, zinc, tin plate, as the case may be as the sole coating layer, or as a primer of primer-surfacer (for example on a primer layer applied by electrodeposition). The paint compositions are particularly suitable for spray application as primer-surfacer. For such applications, the concentration of the composition in step (c) should be adjusted to a solids content in the range of about 25 to 75%w.

Paint compositions whose solids content is adjusted to 10 to 60 %w may also be applied to a substrate by cathodic electrodeposition, as a primer. This application is preferred.

In a preferred embodiment of this invention, step (c) is carried out in two successive operations ($c_1$) and ($c_2$), ($c_1$) comprising neutralizing in the presence of water and ($c_2$) comprising the further adjustment by the addition of water to provide the desired final solids content.

The water may be evaporated and the coating cured by usual means, such as by stoving or by heat radiation. Stoving time and temperature will be dependent on the particular paint composition, and will be in a range usual for thermosetting surface coatings, in general from about 130° C. to 200° C. with curing times varying from about 10 to 60 min.

The invention will be further understood from the following illustrative examples. In the examples, parts and percentages are by weight, unless otherwise indicated. Analytical data are based on non-volatile matter.

Filler components (titanium dioxide, barytes, clay, microtalc, black iron oxide) all had particle size less than 20 micrometers.

EPIKOTE 828 is a trade name for a commercial liquid polyglycidyl ether of 2,2-bis(4-hydroxyphenyl)-propane, which, in the examples, has an epoxy group content of 5320 mmol/kg.

CARDURA E 10 is a trade name for the glycidyl ester of saturated $C_{10}$-monocarboxylic acids, wherein the alpha-carbon atom with respect to the carboxyl group is attached to three alkyl groups at least one of which is methyl and, in the examples, has an epoxy group content of 3975 mmol/kg.

Water is demineralised water.

In each of the examples a glass reactor was used which was equipped with an anchor stirrer, thermocouple, reflux condenser and inlet tubes.

EXAMPLE 1

Azelaic acid (1128 g, 6 mol) and CARDURA EIO (3048 g, 12 epoxy equivalents) were heated together in a glass reactor for one hour at 90° C. To the resulting clear mass was added benzyldimethylamine (10.4 g) resulting in a temperature rise to 140° C. After 2 hours at this temperature, the reaction mixture was cooled to ambient temperature to yield a liquid di-$\beta$-hydroxy ester having an acid content of 0.01 meq/g, an epoxy group content of 0.07 meq/g and a calculated average molecular weight of 692. The viscosity of the ester at 23° C. was 2.8 Pa.s.

A glass reactor was charged with EPIKOTE 828 (188 g, 1 epoxy equivalent) and di-$\beta$-hydroxy ester cross-linking agent (346 g) prepared as described in the previous paragraph and the reactor contents were stirred at ambient temperature until the mixture was homogeneous. The homogeneous mixture was heated to 35° C. and a mixture of titanium dioxide (186 g), barytes (361 g), microtalc extender (29 g) and black iron oxide (5 g) was added portionwise with high speed stirring into the reactor. Continued high speed stirring for 2.5 hours resulted in a homogeneous paste.

Monoethanolamine (15.3 g, 0.25 mol) and diethanolamine (52.5 g, 0.50 mol) were added to the paste with stirring, which resulted in a temperature rise to 70° C. This temperature was maintained for 3.5 hours which resulted in an epoxy group content of the paste of 0.01 meq/g.

At the end of this period, glacial acetic acid (45 g, 0.75 mol) was added portionwise followed by dropwise addition of water (570 g) under high speed stirring.

The resulting paint composition was at ambient temperature an easily pourable grey viscous liquid having a degree of neutralization of 1.0, a pigment to (cross-linking agent plus amine adduct) weight ratio of 1.0 and a solids content of 68% by weight, the solids being the total of pigments, cross-linking agent and amine adduct.

The paint composition containing a transesterification- promoting metal compound was obtained by adding 72.6 g of a 25% by weight solution of zinc acetate dihydrate in water with stirring.

EXAMPLE 2

The reactor used in Example 1 was charged with EPIKOTE 828 (105 g, 0.56 epoxy equivalents) and di-$\beta$-hydroxy ester cross-linking agent (254 g) prepared as described in Example 1, and the reactor contents were stirred at ambient temperature for 0.25 hours to produce a homogeneous mixture. The mixture was heated to 35° C. and a mixture of titanium dioxide (270.5 g) and barytes (270.5 g) was added portionwise with high speed stirring into the reactor. Continued high speed stirring for 2 hours resulted in a homogeneous paste.

The paste was heated to 40° C. and then monoethanolamine (8.6 g, 0.14 mol) and diethanolamine (29.5 g, 0.28 mol) were added under stirring, which resulted in a temperature rise to 80° C. This temperature was maintained for 4 hours, which resulted in an epoxy group content of the paste of 0.02 meq/g.

At the end of this period, glacial acetic acid (25.2 g, 0.42 mol) was added portionwise. After further stirring for 10 minutes, water (377 g) was added dropwise under high speed stirring.

The resulting paint composition was at ambient temperature a pourable white viscous liquid having a degree of neutralisation of 1.0, a pigment to (cross-linking agent plus amine adduct) weight ratio of 1.4 and a solids content of 70% by weight, the solids being defined as in Example 1.

The paint composition containing a transesterification-promoting metal compound was obtained by adding 47.9 g of a 25% by weight solution of zinc acetate dihydrate in water with stirring.

EXAMPLE 3

Azelaic acid (188 g, 1 mol), n-butyl glycidyl ether (273 g, 2.1 epoxy equivalents) and Cordova Accelerator AMC-2 catalyst (2.3 g, AMC-2 is a trade name for an esterification catalyst sold by Cordova Chemical, U.S.A.) were placed in a glass reactor. The reactor contents were heated to 90° C. at which temperature an exothermic reaction started and the temperature rose to 120° C. The temperature was allowed to drop to 110° C. and was kept at this temperature for 5.5 hours. The cross-linking agent thus prepared had an epoxy group content of 0.04 meq/g, a carboxylic acid group content of 0.02 meq/g, a viscosity at 23° C. of 0.2 Pa.s and a calculated average molecular weight of 448.

A glass reactor was charged with EPIKOTE 828 (65.8 g, 0.35 epoxy equivalents) and cross-linking agent (97.8 g) prepared as described in the previous paragraph. The reactor contents were stirred at ambient temperature for 0.25 hours until the mixture was homogeneous. A mixture of titanium dioxide (121 g) and barytes (121 g) was placed portionwise with high speed stirring into the reactor. Continued high speed stirring for 2.5 hours resulted in a homogeneous paste.

The mixture was heated to 40° C., at which temperature monoethanolamine (5.3 g, 0.09 mol) and diethanolamine (18.4 g, 0.18 mol) were added under stirring, which resulted in a temperature rise to 90° C. This temperature was maintained for 4.5 hours, which resulted in an epoxy group content of the paste of 0.01 meq/g.

At the end of this period glacial acetic acid (15.8 g) was added portionwise. After further stirring for 10 minutes, water (168.1 g) was added dropwise under high speed stirring.

The resulting paint composition was at ambient temperature a pourable, white viscous liquid having a degree of neutralisation of 1.0, a pigment to (cross-linking agent plus amine adduct) weight ratio of 1.3, a solids content of 70% by weight, the solids being defined as in Example 1.

The paint composition containing a transesterification-promoting metal compound was obtained by adding 22.6 g of a 25% by weight solution of zinc acetate dihydrate in water with stirring.

EXAMPLE 4

The reactor used in Example 1 was charged with EPIKOTE 828 (188 g, 1 epoxy equivalent), and a mixture of titanium dioxide (76.2 g), barytes (148.2 g) and microtalc extender (12.0 g) was added portionwise with high speed stirring. Stirring was continued until a homogeneous paste was obtained.

Another reactor as used in Example 1 was charged with di-β-hydroxy ester cross-linking agent (346 g) prepared as described in Example 1 and a mixture of titanium dioxide (110 g), barytes (213 g), microtalc extender (17 g) and black iron oxide (5 g) was added portionwise with high speed stirring. Stirring was maintained until a homogeneous paste was obtained.

The two pigment pastes prepared as described hereinbefore were placed in a glass reactor as used in Example 1. The contents of this reactor were heated to 40° C. and stirred until a homogeneous paste was obtained.

Then, monoethanolamine (15.3 g, 0.25 mol), methyl-2-hydroxyethylamine (18.8 g, 0.25 mol) and diethylamine (18.3 g, 0.25 mol) were added to the paste under stirring and the temperature was allowed to rise to 60° C. This temperature was maintained for 3 hours, which resulted in an epoxy group content of the paste of 0.01 meq/g.

At the end of this period glacial acetic acid (45 g) was added portionwise followed by dropwise addition of water (452 g) under high speed stirring.

The resulting paint composition was at ambient temperature an easily pourable grey viscous liquid having a degree of neutralisation of 1.0, a pigment to (cross-linking agent plus amine adduct) weight ratio of 1.0 and a solids content of 70% by weight, the solids being defined as in Example 1.

The paint composition containing a transesterification-promoting metal compound was obtained by adding 70.7 g of a 25% by weight solution of zinc acetate dihydrate in water with stirring.

The four paint compositions obtained as described in the four Examples were further diluted with water under stirring until the solids contents stated in Table 1 hereinafter were obtained.

Properties of these diluted ready to use paints of the four Examples are presented in said Table 1.

TABLE 1

| Example | Pigment/binder weight ratio | pH | Solids, % by weight | Viscosity at 23° C. Pa.s. | Storage stability at 40° C. |
|---------|---|---|---|---|---|
| 1 | 1.0 | 5.6 | 59 | 0.29 | Excellent |
| 2 | 1.4 | 5.4 | 63 | 0.44 | Excellent |
| 3 | 1.3 | 5.4 | 59 | 0.30 | Excellent |
| 4 | 1.0 | 5.5 | 55 | 0.29 | Excellent |

TABLE 2

| Example | Film thickness, micrometers | Stoving schedule, 30 mi/°C. | MEK rubs | Impact strength | Boiling water resistance | Salt spray resistance, 10 day mm loss; appearance |
|---------|---|---|---|---|---|---|
| 1 | 45 | 190 | greater than 50 | good | good | 1; excellent |
| 2 | 50 | 180 | greater than 50 | good | excellent | 1; excellent |
| 3 | 50 | 170 | greater than 50 | excellent | excellent | 1; good |
| 4 | 40 | 190 | greater than 50 | moderate to good | — | 1; excellent |

In Table 1, "pigment" denotes all filler components, e.g. titanium dioxide, barytes, microtalc and black iron oxide, and "binder" denotes combined weight of all organic material. In all Examples, zinc was present in an amount of 0.9% by weight based on combined weight of all non-volatile organic material.

Viscosity was measured using a Brookfield ® viscometer.

Storage stability was assessed after eight weeks storage.

The term "excellent" denotes no more than easily-redispersed, slight settlement of solids, no change in overall viscosity.

The diluted ready to use aqueous paint compositions of Examples 1 to 4 were tested by applying by bar coater to phosphated steel panels which were dried for 10 minutes at 50° C. and cured by stoving for 30 minutes at the temperature indicated in Table 2. After stoving the films of each of the four examples were smooth and matt. Film thickness, appearance, mechanical properties, and solvent and water resistance were assessed.

Results of the tests are given in Table 2, in which "MEK rubs" is the number of double rubs given to the cured coating with a cloth wetted with methyl ethyl ketone until the coating was wiped off. MEK rubs greater than 50 is indicative of good cure and good solvent resistance. Impact strength is reversed impact strength determined according to the British Standard Falling ball test, recorded according to the following scale:
E (excellent): coating not damaged;
G (good) : coating slightly damaged;
M (moderate) : coating clearly damaged;
P (poor) : coating destroyed,
when applying a reverse impact strength of 90 cm.kg. No damage indicates very good flexibility.

Water resistance is assessed visually on the coating submerged in boiling water for three days and according to the following scale: excellent (no blisters), good (some blisters), moderate (many blisters), poor (unacceptable blistering).

Salt spray resistance was determined according to ASTM-B-117-64 and was recorded as mm loss of adhesion from scratch after ten days. The appearance was assessed visually according to the scale given in the preceding paragraph.

EXAMPLES 5–8

The experiment of Example 3 was repeated up to the addition of glacial acetic acid. The suspension of particles coated with epoxy-amine adduct and cross-linking agent was divided into four equal portions, referred to hereinafter as portions 1, 2, 3 and 4.

To portion 1 (Example 5), glacial acetic acid (4.0 g) was added portionwise. After further stirring for 10 minutes, water (42.0 g) was added dropwise under high speed stirring. Ready to use paint was obtained by adding with stirring 5.65 g of a 25% by weight solution of zinc acetate dihydrate in water, followed by addition of water (18.4 ml).

To portion 2 (Example 6), glacial acetic acid (3.0 g) was added portionwise. After further stirring for 10 minutes, water (43.0 g) was added dropwise under high speed stirring. Ready to use paint was obtained by adding with stirring 5.65 g of 25% by weight solution of zinc acetate dihydrate in water, followed by addition of water (19.3 ml).

To portion 3 (Example 7), glacial acetic acid (2.0 g) was added portionwise. After further stirring for 10 minutes, water (44.0 g) was added dropwise under high speed stirring. Ready to use paint was obtained by adding with stirring 5.65 g of a 25% by weight solution of zinc acetate dihydrate in water, followed by addition of water (19.9 ml).

To portion 4 (Example 8), glacial acetic acid (1.6 g) was added portionwise. After further stirring for 10 minutes, water (44.4 g) was added dropwise under high stirring. Ready to use paint was obtained by adding with stirring 5.65 g of a 25% by weight solution of zinc acetate dihydrate in water, followed by addition of water (23.6 ml).

The ready to use paints were at ambient temperature easily pourable, white viscous liquids. They had a pigment to (cross-linking agent plus amine adduct) weight ratio of 1.3. A few properties of these ready to use paints are presented in Table 3.

TABLE 3

| | Example | | | |
|---|---|---|---|---|
| | 5 | 6 | 7 | 8 |
| Degree of neutralization | 1.00 | 0.75 | 0.50 | 0.40 |
| pH | 5.4 | 5.8 | 6.2 | 6.3 |
| Solids content, % by weight | 61 | 61 | 61 | 60 |
| Viscosity at 23° C., Pa.s | 0.34 | 0.34 | 0.34 | 0.35 |

It can be seen from Table 3 that the solids content was relatively high at the viscosity shown.

The ready to use paints were applied by bar coater onto bare steel panels. The wet films were dried for 10 min at 50° C. and cured by stoving for 30 min at 170° C. Each of the four films thus obtained had an excellent impact strength and a MEK rubs value of greater than 50.

We claim:

1. A process for preparing an aqueous paint composition comprising the steps of
   (a) mixing a pigment power having a particle size less than about 20 micrometers, a crosslinking agent and an epoxy resin to form a liquid, solvent-free paste;
   (b) reacting the liquid, solvent-free paste with an amount of an amine selected from the group consisting of secondary amines and mixtures of secondary amines and primary amines sufficient to provide at least one N—H function per epoxy group of the epoxy resin to form a suspension of particles coated with an epoxy-amine adduct and the cross-linking agent;
   (c) neutralizing the suspension of particles; and
   (d) adjusting the concentration of the resulting dispersion to provide a solids content in the range of from about 25 to 75 solids by addition of water.

2. The process of claim 1 in which step (a) is carried out by dispersing the pigment powder in a solvent-free liquid mixture of the cross-linking agent and the epoxy resin.

3. The process of claim 1 in which the epoxy resin is a liquid polyglycidyl ether of a polyhydric phenol.

4. The process of claim 3 in which the epoxy resin is a liquid polyglycidyl ether of a dihydric phenol.

5. The process of claim 1 in which the secondary amine comprises at least one compound selected from the group consisting of di($C_{2-6}$)alkanol)amines, N-$C_{1-6}$-alkyl-$C_{2-6}$-alkanolamines, di($C_{1-6}$-alkanol)amines, and adducts of $C_{2-6}$-alkanolamines with $C_{9-25}$-aliphatic monoepoxides, in each of which amines a hydrogen atom bound to a carbon atom may be substituted by a di($C_{1-6}$-alkyl amino group.

6. The process of claim 1 in which the liquid, solvent-free paste is reacted in step (b) with a mixture of a secondary amine and a primary amine 7. The process of claim 6 in which the primary amine is selected from the group consisting of $C_{2-6}$-alkanolamines and $C_{1-6}$-alkylamines, in each of which amines a hydrogen atom bound to a carbon atom may be substituted by a di($C_{1-6}$-alkyl)amine group.

8. The process of claim 1 in which the weight ratio of the pigment power to the (crosslinking agent plus epoxy-amine adduct) is within the range of about 0.4 to 1.5.

9. The process of claim 8 in which the pigment powder has a particle size less than about 10 micrometers and comprises at least one pigment powder selected from the group consisting of titanium oxide, barytes, clay, microtalc and black iron oxide.

10. The process of claim 8 in which the step (c) the suspension is neutralized to a degree of neutralization in the range 0.2 to 1.5 by addition of a monobasic $C_{2-6}$-carboxylic acid.

11. The process of claim 8 in which the crosslinking agent comprises at least one compound selected from the group consisting of a phenolic resin, an aminoplast resin, a blocked polyisocyanate, and a non-acidic polyester of a polycarboxylic acid having at least two beta-hydroxyl ester groups per molecule.

12. The process of claim 1 in which the crosslinking agent comprises a non-acidic polyester of a polycarboxylic acid having more than one beta-hydroxyl group per molecule.

13. The process of claim 1 in which step (c) is carried out in two successive operations $(c_1)$ and $(c_2)$, $(c_1)$ comprising neutralizing in the presence of water and $(c_2)$ comprising the further adjustment by the addition of water to provide the desired solids content.

14. The process of claim 12 in which a transesterification-promoting metal compound is incorporated in the composition during or after step (c).

* * * * *